United States Patent [19]

Papalardo

[11] 4,171,567
[45] Oct. 23, 1979

[54] NUTCRACKER

[76] Inventor: William A. Papalardo, P.O. Box 273, Centerport, N.Y. 11721

[21] Appl. No.: 844,211

[22] Filed: Oct. 21, 1977

[51] Int. Cl.² .................. B26B 17/00; A47J 17/02
[52] U.S. Cl. ............................................. 30/120.4
[58] Field of Search ............... 30/120.1, 120.2, 120.3, 30/120.4, 120.5; 81/3.44

[56] References Cited

U.S. PATENT DOCUMENTS

| | | | |
|---|---|---|---|
| 1,281,575 | 10/1918 | Ives | 81/3.44 |
| 1,649,468 | 11/1927 | Greene | 30/120.3 |
| 2,444,634 | 7/1948 | Daniel | 30/120.4 |
| 2,758,622 | 8/1956 | Greenblatt | 30/120.4 |
| 2,989,103 | 6/1961 | Carlson | 30/120.4 |

Primary Examiner—Jimmy C. Peters
Attorney, Agent, or Firm—Strimbeck & Soloway

[57] ABSTRACT

The invention provides an adjustable cracking device for cracking nuts of a wide variety of sizes. The device comprises first and second elongate rigid members, each including an elongate handle portion and having a curved serrated gripping surface adjacent one end thereof. The elongate rigid members are pivotally connected together adjacent the gripping surface sections thereof for movement toward and away from one another. In one embodiment of the invention, the elongate members are pivotally connected by an adjustable fulcrum formed integrally by the elongate members. In a second embodiment of the invention the first elongate member is pivotally mounted to a central coupling member for movement toward and away from the second elongate member. The second elongate member has an additional serrated gripping surface on its side opposite the first gripping surface. The second elongate member is mounted to the coupling member for rotational movement between a first position in which one of its gripping surfaces faces the gripping surface on the first elongate member and a second position in which the other surface faces the gripping surface on the first elongate member.

6 Claims, 12 Drawing Figures

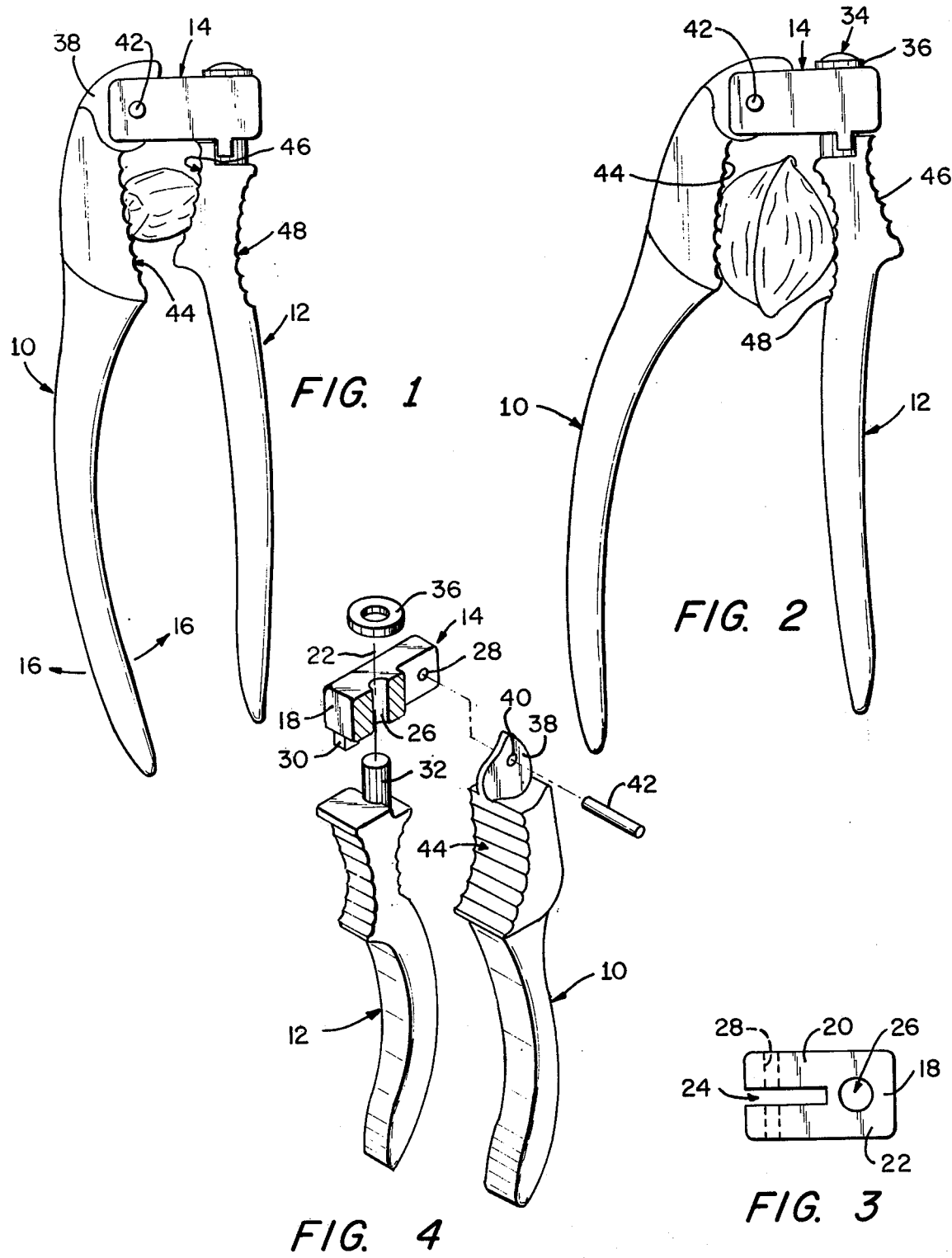

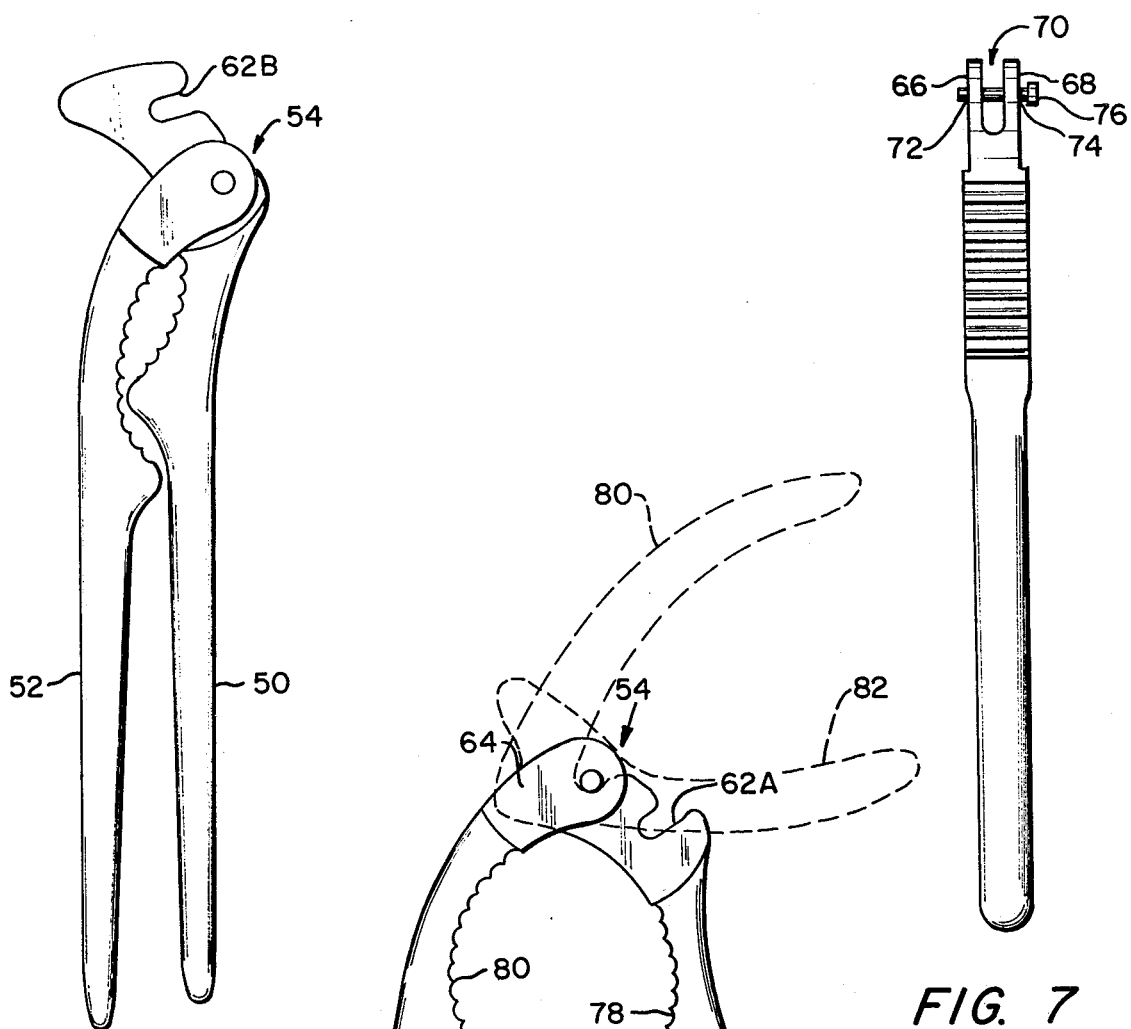

NUTCRACKER

This invention relates to an improved cracking device, and more particularly to a new nutcracker which is adjustable to accommodate different shapes and sizes of nuts.

Various nutcrackers which are adjustable to accommodate nuts of different size and shape are known in the art and are described, for example, in U.S. Pat. Nos. 215,243 (Ritchel), 896044 (Quackenbush); 1,268,484 (Olasz); 1,483,459 (Kroon); 1,710,629 (Lindsey); 1,938,733 (Walling) and others. Such known nutcrackers have one or more drawbacks. For example, The Quackenbush, Walling and Olasz nutcrackers generally have not been fully satisfactory since the point at which the nut (or other article to be cracked) are gripped and cracked, does not lie below the fulcra of the lever arms. Kroon proposes to overcome this problem by providing a cracking device having an auxillary gripping member mounted on one of the lever arms for changing the gap between the two lever arms. On the other hand, the Kroon patented cracking device and the other prior art cracking devices generally are prone to loosen with use. Moreover, the design of such prior art cracking devices is such as to present a danger that the user may pinch his fingers between the handle ends.

Thus, a primary object of the present invention is to provide an improvement over known nutcrackers.

Another primary object of this invention is to provide a nutcracker which is adjustable for cracking different size nuts.

Still another object is to provide a nutcracker in which the handle ends are arranged so that they cannot close entirely against one another whereby the possibility that the user may pinch his fingers or hand is reduced or eliminated.

The foregoing and other objects are achieved by a novel cracking device which comprises first and second elongate rigid members, each including a handle having a curved serrated gripping surface adjacent one end thereof. The elongate rigid members are pivotally connected together adjacent the gripping surface sections thereof for movement toward and away from one another. In one embodiment of the invention, the elongate members are pivotally connected by an integral, adjustable fulcrum. In a second embodiment of the invention, the first elongate member is pivotally mounted to a central coupling member for movement toward and away from the second elongate member. The second elongate member has an additional serrated gripping surface on its side opposite the first gripping surface. The second elongate member is mounted to the coupling member for rotational movement between a first position in which one of its gripping surfaces faces the gripping surface on the first elongate member and a second position in which the other surface faces the gripping surface on the first elongate member.

Still other features and advantages of the invention are described or rendered obvious by the following detailed description which is to be considered together with the accompanying drawings wherein like numerals depict like parts, and wherein:

FIG. 1 is an elevational view of one embodiment of a cracking device constructed in accordance with the invention and showing the manner in which the device is arranged for cracking relatively small size nuts;

FIG. 2 is a view like FIG. 1 and shows the manner in which the device is arranged for cracking relatively large diameter nuts;

FIG. 3 is a top plan view of an adjustable coupling member element of the cracking device of FIG. 1;

FIG. 4 is an exploded view in perspective, showing the various elements of the cracking device of FIG. 1;

FIG. 5 is an elevational view of a third embodiment of a cracking device constucted in accordance with the invention and showing the manner in which the device is arranged for cracking relatively small size nuts;

FIG. 6 is a view like FIG. 5 and shows the manner in which the device is arranged for cracking relatively large diameter nuts;

FIG. 7 is a top plan view of the cracking device of FIG. 5 and shows details of an adjustable fulcrum pivot.

Figure 1A:
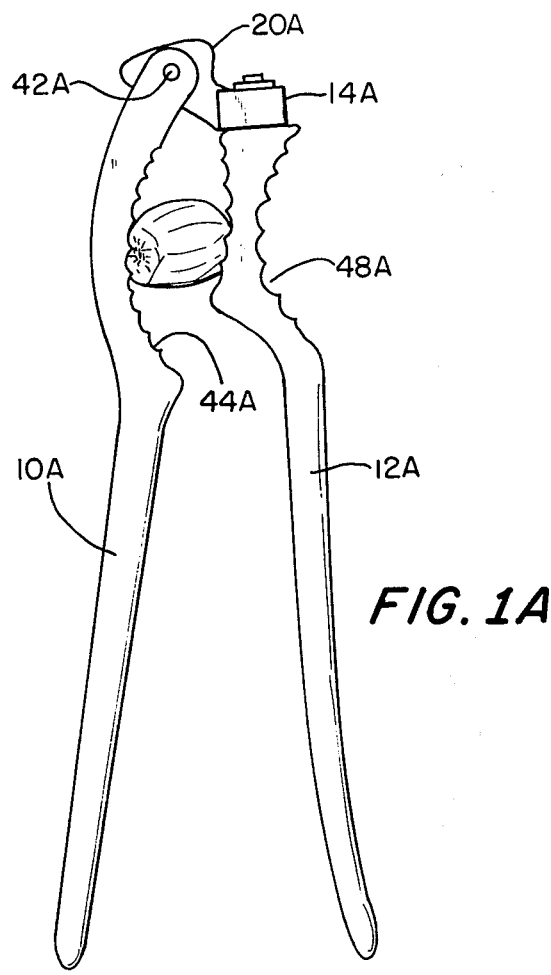
FIG. 1A is a view like FIG. 1 of a second embodiment of cracking device in accordance with the invention.

It is to be understood that the cracking device provided by the present invention is not restricted to the specific construction shown in the drawings and that the device need not be used solely for the purposes of cracking nuts. For example, the cracking device may be used for cracking lobster claws or for cracking hard shelled edibles.

Figure 2A:
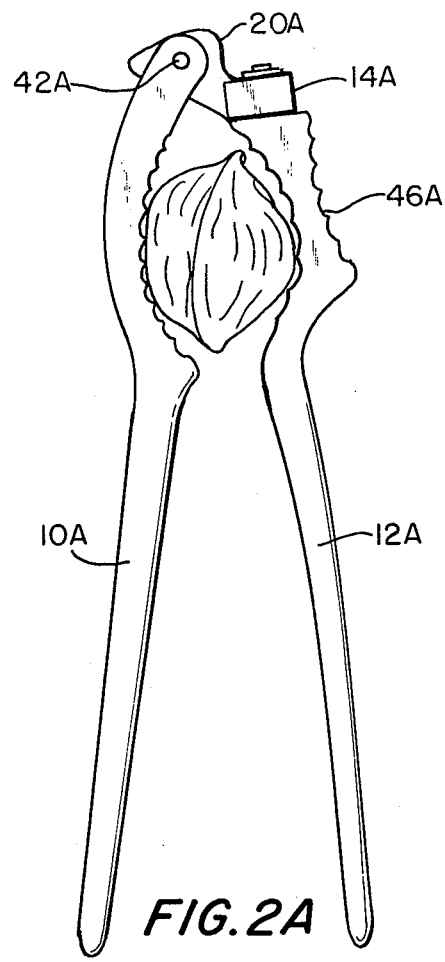
FIG. 2A is a view like FIG. 2 of the cracking device of FIG. 1A.
Figure 4A:
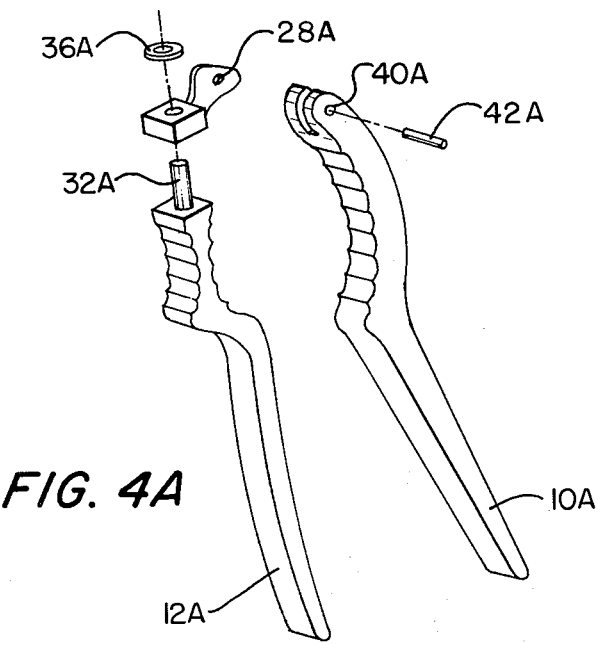
FIG. 4A is a view like FIG. 4 of the cracking device of FIG. 1A.

Referring first to FIGS. 1–4, in one embodiment the cracking device comprises two rigid elongate handle members 10 and 12 which are connected at one end to a central coupling member 14. Handle member 10 is pivotally connected to coupling member 14 so that its free end is moveable toward and away from the free end of the other handle member 12, i.e. in the direction of arrows 16—16. Handle member 12 is rotatably connected to coupling member 14 so as to be axially rotatable between a first position as shown in FIG. 1 and a second position as shown in FIG. 2.

Figure 3A:
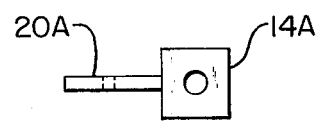
FIG. 3A is a view like FIG. 3 of the cracking device of FIG. 1A.

Referring in particular to FIGS. 3 and 4, coupling member 14 comprises a generally U-shaped block including a bridge area 18 and two opposed arms 20 and 22 which define a slot 24 therebetween. A first bore or hole 26 is formed through the bridge area 18 of the coupling member with its central axis parallel to slot 24. A second bore or hole 28 is formed extending through the coupling member arms 20 and 22. Preferably hole 28 central axis is substantially perpendicular to hole 26. Completing the coupling member 14 is as short tang or boss 30 which extends downwardly from the coupling bridge area 18 adjacent the leg 22 side of hole 26. The purpose of boss 30 will become clear from the description following.

Referring in particular to FIG. 4, the upper end of handle member 12, i.e. the end adjacent coupling member 14, has a rodlike extension 32. Extension 32 may be formed integrally with handle member 12 or may comprise a separate short solid rod joined to the end of handle member 12. Rod 32 has an outer diameter which is slightly less than the diameter of hole 26, i.e. so that handle member 12 may be rotatably mounted to coupling member 14. Rod 32 is also sufficiently long so as to extend through coupling member 14 and the rod upper end is locked to handle member 14 for pivotal movement in coupling member 14, e.g. as by peening at 34. As seen in FIG. 4 a washer 36 perferably is inserted between peened head 34 and the main body of coupling member 14. Obviously, handle member 14 can be locked for pivotal movement in coupling member 14 by other means as are well known in the art.

The upper end of handle member 10, i.e. the end adjacent coupling member 14 is formed with a flat narrow extension 38. Extension 38 has a width which is slightly less than the opening slot 24, i.e. so that handle member 10 may be pivotally mounted to coupling member 14. A hole 40 is formed in extension 38 and is sized to accept a pin 42 which is press fitted through holes 28 in coupling arms 20 and 22.

As shown in FIGS. 1, 2 and 4, the end of handle member 10 adjacent coupling member 14 is provided with a concave, serrated gripping surface 44. The end of handle member 12 adjacent coupling member 14 has a pair of serrated, generally concave gripping surfaces 46 and 48 for coacting with handle 10 gripping surface 44. Gripping surfaces 46 and 48 are formed on opposite sides of handle member 12 so that only one of surfaces 46 and 48 faces surface 44 at a time. Preferably handle members 10 and 12 are greatest in cross-section adjacent their respective gripping surfaces 44, and 46 and 48, respectively, and one of the gripping surfaces, e.g. surface 44 is greater in cross-section than the other gripping surfaces 46 and 48, respectively. As seen in FIGS. 1 and 2, gripping surfaces 46 and 48 have different shape and curvatures. This makes the device adjustable for cracking different size nuts. Thus, for example, when handle member 12 is rotated so that gripping surface 46 faces handle member gripping surface 44, the device is especially suited for gripping and cracking relatively small nuts (see FIG. 1). Likewise, when handle 12 is rotated so that surfaces 44 and 48 face each other, the device is especially adapted for cracking relatively large nuts (see FIG. 2).

A second embodiment of nutcracker made in accordance with the present invention is illustrated in FIGS. 1A-4A. The embodiment of FIGS. 1A-4A is generally similar to the FIGS. 1-4 embodiment with some exceptions as will be detailed below. For one, coupling member 14A essentially comprises a single wing 20A nut. Also, the upper end of handle member 10A comprises a generally U-shaped integral extension for accommodating wing 20A, i.e. so that the coupling member 14A can be pivotally mounted to handle member 10A. A hole 40A is formed in the U-shaped extension and is sized to accept a pin 42A which is press fitted through hole 28A in wing 20A. Finally, the upper end of handle member 12A can be essentially flat at its top end (except for rod like extension 32A). The embodiment of FIGS. 1A-1A has the advantage that arm 12A is essentially self-centering, i.e., as long as the arm is turned so that one or the other serrated gripping surface 46A or 48A more or less faces the serrated gripping surface 44A of arm 10A.

A third embodiment of nutcracker made in accordance with the present invention is illustrated in FIGS. 5-7. Referring in particular to FIGS. 5 and 6, the cracking device comprises two rigid elongate handle members 50 and 52 which are joined together at one end thereof at 54. The handle members 50 and 52 are pivotally connected at 54 so that their free ends are movable toward and away from one another, i.e. in the direction of arrows 56-56.

Figure 8:
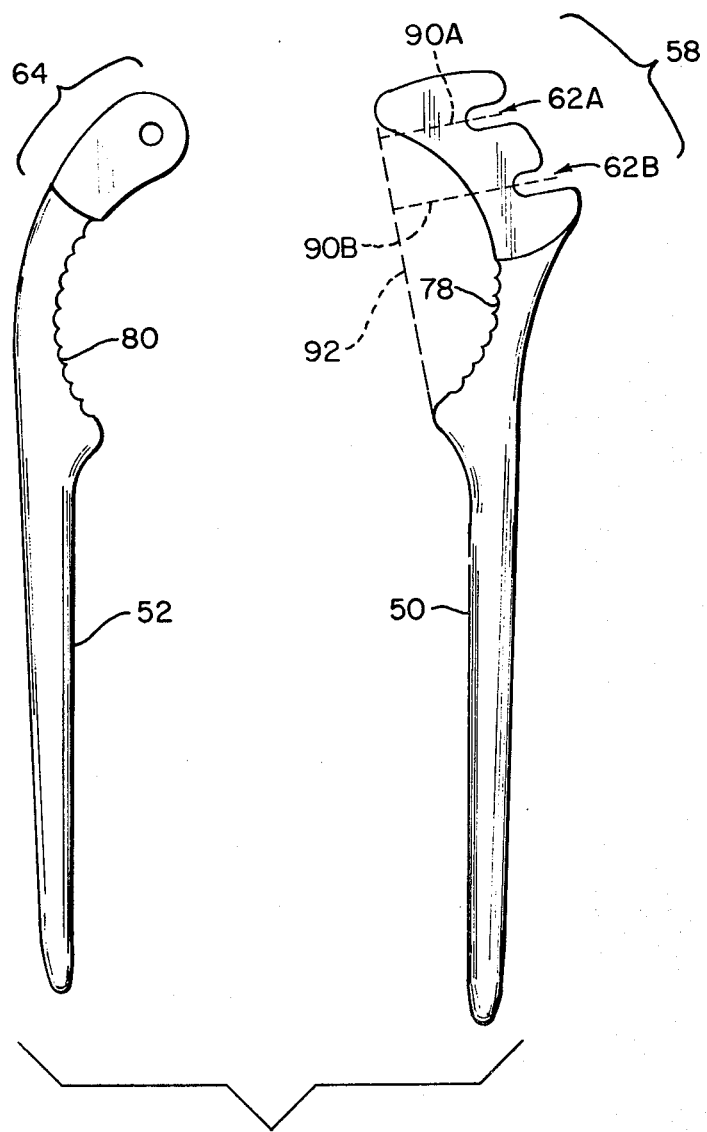
FIG. 8 is an exploded view in perspective, showing various elements of the cracking device of FIG. 5.

Handle member 50 is provided with an arm 58, which is disposed as an extension of the handle at the pivot end thereof, i.e. the end adjacent 54. Arm 58 is formed as a relatively narrow elongate extension of the handle. As seen in particular in FIG. 8, arm 58 includes two or more generally U-shaped openings or notches 62A, B. Preferably notches 62A and 62B are angled, e.g. as shown in FIG. 8, so that lines 90A and 90B which bisect notches 62A and 62B are normal to an imaginary line 92 subtending the concave gripping end 94 of member 50. The purpose of notches 62A, B and of angling notches 62A and 62B in the aforesaid manner will become clear from the description following.

The pivot end of handle member 52, i.e. the end adjacent 54 is formed as a short, generally U-shaped extension 64 including two opposed areas 66 and 68 which define a slot 70 therebetween. The latter has an open width slightly greater than arm 58 so that the arm 58 of handle member 50 can be inserted into the slot 70. A pair of opposed holes 72 and 74 are formed in arms 66 and 68, respectively, and are sized to accept a pin 76 which is press fitted through the holes 72 and 74 and engage a selected notch 62A or 62B, etc. with the result that the fulcrum may be shifted. Pin 76 may comprise a square post pin as is employed in conventional slip joint pliers; preferably, however, pin 76 will comprise a round post pin.

As shown in FIGS. 6 and 8, the ends of handle members 50 and 52 adjacent end 54 are provided with concave gripping surfaces 78 and 80, respectively. Concave gripping surfaces 78 and 80 preferably have substantially identical curvatures. However, the curvature of surfaces 78 and 80 need not be constant over their respective lengths. Preferably one of the ends, e.g. the gripping end of handle member 52 is greater in cross-section than the gripping end of handle 50.

As seen in phantom in FIG. 6 arms 50 and 52 may also be provided with integral extension arms 80 and 82 outside the pivot point so as to increase the operating range of the cracking device.

One skilled in the art will recognize certain advantages the nutcracking devices of the present invention have over the prior art devices. The devices may be used for cracking nuts of a great variety of sizes. Moreover, the cracking devices may be used for cracking other than nuts, e.g. crustacean shells and the like. The devices also can be advantageously used for gripping, e.g. as like pliers. The FIG. 6 extensions 80 and 82 are particularly suited for such use. Moreover, due to the curvature of the handles, the user will have a good mechanical advantage for cracking both large and small nuts. For example, for cracking a relatively large nut using the FIG. 1 embodiment of the invention, handle 12 is rotated in the FIG. 2 position which means that the user will hold the device with his fingers engaging with the concave side of handle 12, i.e. handles 10 and 12 nest relative to one another. Conversely, when a relatively small diameter nut is being cracked, handle 12 is rotated to the FIG. 1 position with the result that the user will grip the device with his fingers engaging the convex side of handle 12, i.e. the handles are bowed outwardly relative to one another. The FIG. 5 embodiment similarly can be adjusted relative to the size of the nut being cracked by changing the position of the fulcrum, e.g. by sliding pin 76 into a selected notch 62A or 62B. Thus, even in the case of relatively large nuts, the handles will not be so far apart as to make pressing the handles together either difficult or uncomfortable. Moreover, due to the angle of notches 62A and 62B as above discussed, when the handles are squeezed together a component of force will tend to drive pin 76 towards the closed end of its associated notch 62A or 62B. As a result, the possibility that the pivot pin 76 will slip from a selected notch is reduced. Another advantage of the invention is that mechanical advantage may be achieved no matter what the size of the nut. The device has other advantages. For examples, by suitably selecting dimensions of the various parts, the far ends of the elongate members 10 and 12, i.e. opposite coupling member 14 (FIG. 1) cannot be made to engage each other so as to pinch the user. Obviously, similar considerations and advantages apply to the FIG. 5 embodiment. Still another advantage of the invention is the sturdyness of cracking device due to the pivot and hinge construction provided by coupling member 14. Still other advantages will be obvious to one skilled in the art.

I claim:

1. A cracking device, comprising in combination:
a first elongate rigid member having a first generally concave surface for engaging the object to be cracked, and an elongate handle portion; and
a second elongate rigid member having a second generally concave surface for engaging the object to be cracked, and an elongate handle portion;
said first and second elongate members being pivotally linked together adjacent their respective object engaging surfaces by an adjustable fulcrum which comprises (1) a relatively narrow extension arm formed adjacent the linked end of one of said elongate members, said extension arm (a) having at least two notches, wherein (b) said at least two notches are angled so that bisecting lines thereof are generally normal to an imaginary line subtending the concave surface of said one elongate member, and (2) a short, generally U-shaped extension formed adjacent the linked end of the other of said elongate members, said U-shaped extension including two opposed arms which define a slot of opening slightly greater than the width of said relatively narrow extension arms and having a pivot pin which extends therethrough, said pivot pin being adapted so as to engage a selected one of said notches, said elongate members being linked together so that said concave surfaces face one another, said elongate members being shaped so that midsection points on said members can be made to engage one another, while the ends of said members opposite said pivotally linked ends cannot be made to engage one another.

2. A cracking device according to claim 1 wherein said concave surfaces are serrated at least in part.

3. A cracking device according to claim 1 wherein one of said rigid members is greater in cross-section than the other member, at least for a length thereof including said concave surfaces at least in part.

4. A cracking device according to claim 1 wherein said first and second concave surfaces are provided with integral extensions adjacent their respective handle portions.

5. A cracking device according to claim 4 wherein said fulcrum is adjustable between a first pivot position wherein said extensions are engageable with one another and a second pivot position wherein the extension of one of said members is engageable with the concave surface on the other of said members.

6. A cracking device according to claim 1 wherein said first and second elongate members are provided with integral extensions arms outside their respective pivot points.

* * * * *